United States Patent [19]

Takei et al.

[11] Patent Number: 5,278,950
[45] Date of Patent: Jan. 11, 1994

[54] IMAGE COMPOSING METHOD

[75] Inventors: Yumiko Takei; Kazuhiko Akimoto; Fumio Hoshino, all of Kaisei, Japan

[73] Assignee: Fuji Photo Film Co., Ltd., Kanagawa, Japan

[21] Appl. No.: 978,049

[22] Filed: Nov. 18, 1992

Related U.S. Application Data

[63] Continuation of Ser. No. 563,385, Aug. 7, 1990, abandoned.

[30] Foreign Application Priority Data

Sep. 20, 1989 [JP] Japan .................................. 1-244825

[51] Int. Cl.⁵ .............................................. G06F 15/62
[52] U.S. Cl. .................................... 395/134; 395/135; 395/148; 395/155; 395/161
[58] Field of Search ................................ 395/133–135; 145, 146, 148, 149, 155, 161, 162, 164; 364/518–523

[56] References Cited

U.S. PATENT DOCUMENTS

4,984,183 1/1991 Ohuchi ................................. 395/134
5,018,078 5/1991 Urabe et al. ......................... 395/164

Primary Examiner—Gary V. Harkcom
Assistant Examiner—Almis Jankus
Attorney, Agent, or Firm—Sughrue, Mion, Zinn, Macpeak & Seas

[57] ABSTRACT

An image processing system having an input controller, a file server, an image setter, and a work station, each of which includes a separate and independent CPU. These CPUs operate simultaneously to provide high speed image processing. This system allows a user to combine and interactively edit various types of information, such as characters, designs and images, when the information is displayed upon a work station. After a user interactively edits this image information, a composed final image is stored in memory. The system also eliminates pattern frames, representing contour border lines around segments of the image, by superimposing an eliminating frame upon the contour lines.

9 Claims, 9 Drawing Sheets

IMAGE COMPOSING METHOD

This is a continuation of application Ser. No. 07/563,385 filed Aug. 7, 1990 now abandoned.

BACKGROUND OF THE INVENTION

1. Field of the Invention

This invention relates to an image composing method in an image processing system which reads out an image of characters and an image of designs drawn on a layout pasteboard (blockcopy pasteboard, rough design sheet and the like) to carry out a layout-designed output, to the method allowing a design to output alone without outputting a frame when a design and a screen and the like are fit into the layout pasteboard to output an image.

2. Description of the Prior Art

It has been heretofore desirable to provide an image processing system for typographers who require high quality printed matter in which characters, designs or the like are consolidated as a whole for editing the same. Notwithstanding, such system has not been proposed but is less capable and practical in use even if it is available.

Particularly, among others, a desk top publishing art has been gradually realized in a manner of description such as a post script and the like, but is still less capable and efficient of an image art. Systems for the typographers has been of course, available but are insufficient in handling (input, display, storage, processing, edition, and output and the like) data in bulk and at a high speed. This is because data consisting of information on characters and images is too much to be synthetically processed by a description language and a central processing unit (CPU; software), thus exhibiting a poor performance. In the case of outputting only code data for manufacturing a block copy for printing, it is necessary to convert the code data to bit map data for each character and develop it in to the bit map data every few raster scans. In the case of outputting only the bit map data, the whole or a part of the output image is stored at a temporary buffer and then transferred to an output unit. However, in order to reduce the capacity of the above buffer, the output unit awaits during the time when the output image is stored at the buffer.

However, the apparatus described above can not simultaneously output characters and pictures laid out and needs much time to determine whether it carries a layout of the character bit map in the buffer which outputs the characters and the pictures on separate paper or photographic films, respectively, and an operator patches on the paper or photographic films. Under these situations, it takes much time due to the repetition work such as exposure or printing, and photosensitive materials intermediately produced are wasted.

Further, when a pattern frame is formed on the basis of a frame on an image of a layout pasteboard (i.e., an unruled edge), it is necessary to cancel or eliminate the frame on the layout pasteboard. In such a situation, because the frame on the layout pasteboard extends beyond the formed pattern frame, it is necessary for eliminating the frame to convert each black picture element on the image of the layout pasteboard one by one into a white picture element or alternatively to cover the frame by another new pattern frame which may be generated to overlap the whole of the frame.

SUMMARY OF THE INVENTION

This invention has been accomplished in view of what is discussed above. The object of this invention is, therefore to provide an image composing method in an image processing system which interactively edits and processes a large quantity of image character and picture data at a high speed, in case of designing the layout drawing according to the frame on the image of the layout pasteboard which is inputted as image information, to the method allowing the output image to output not only with the frame, but also alone, if required, with the frame on the layout pasteboard being eliminated, without any extra instruction.

According to one aspect of this invention, for achieving the objects described above, there is provided an image composing method, in an image processing system comprising an input controller to dot and compress data for an image read out by an input unit and for temporarily storing said compressed image data at a buffer; a work station to picture-edit not only code information edited by an editing input but also image data by the use of an input operating means and a display means; a file server connected to said input controller and said work station by bus lines for storing said image data, said code information and edited data picture-edited (also referred to as graphically editing) by said work station in a memory means; and an image setter for reading out said edited data stored in said memory means and subjecting said edited data to a required data processing to output the image on the image output unit, which comprises the steps of: inputting an image of a layout pasteboard for printing and/or a print image as image information by means of said input unit so as to store them in said memory means, displaying the image of said layout pasteboard and said print image on said display means to be subjected to layout-drawing process in said work station, when the layout image, being adapted to have a higher resolution than said display image, is outputted and recorded with being fit into the frame on said layout pasteboard in said image output unit, generating an eliminating frame according to the pattern frame of said layout image and overlapping said eliminating frame on said layout image in order to prevent said frame from outputting when the composed image is recorded.

The nature, principle and utility of the invention will become more apparent from the following detailed description when read in conjunction with the accompanying drawings.

DESCRIPTION OF THE PREFERRED EMBODIMENT

Figure 1A:
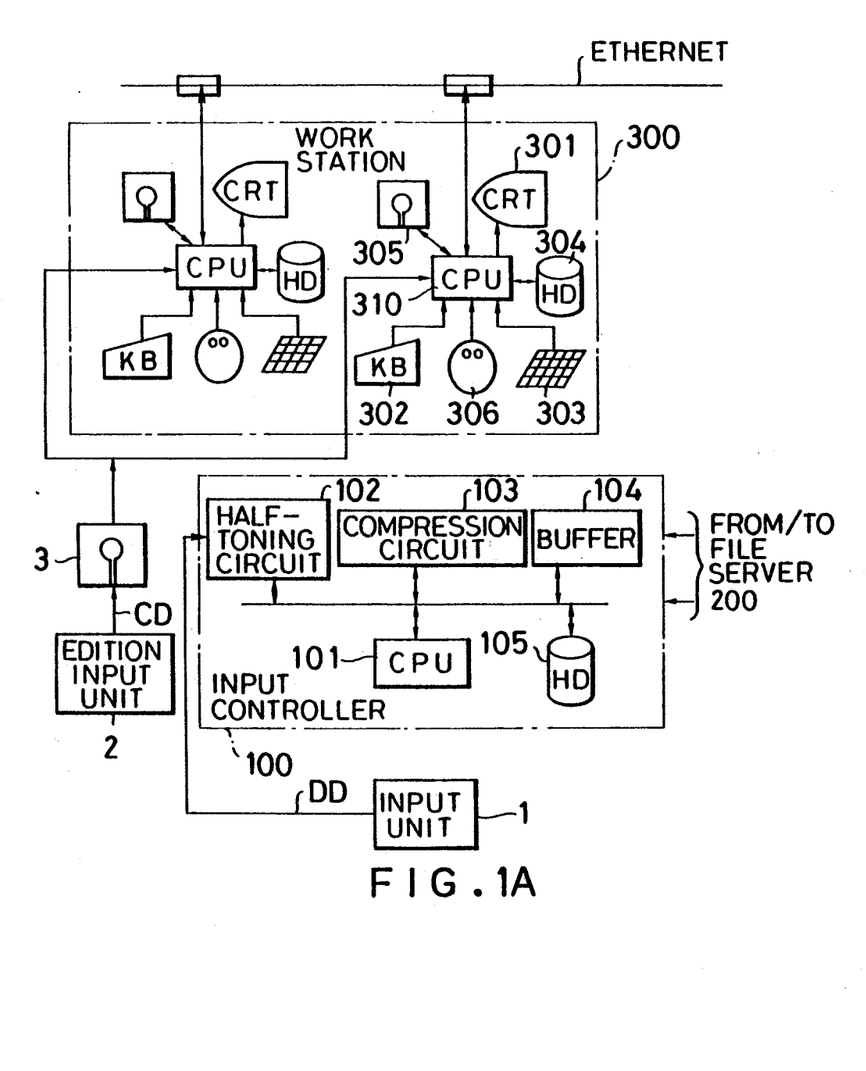
FIGS. 1A and 1B are block diagrams showing the overall configuration of the image processing system of this invention.
Figure 1B:
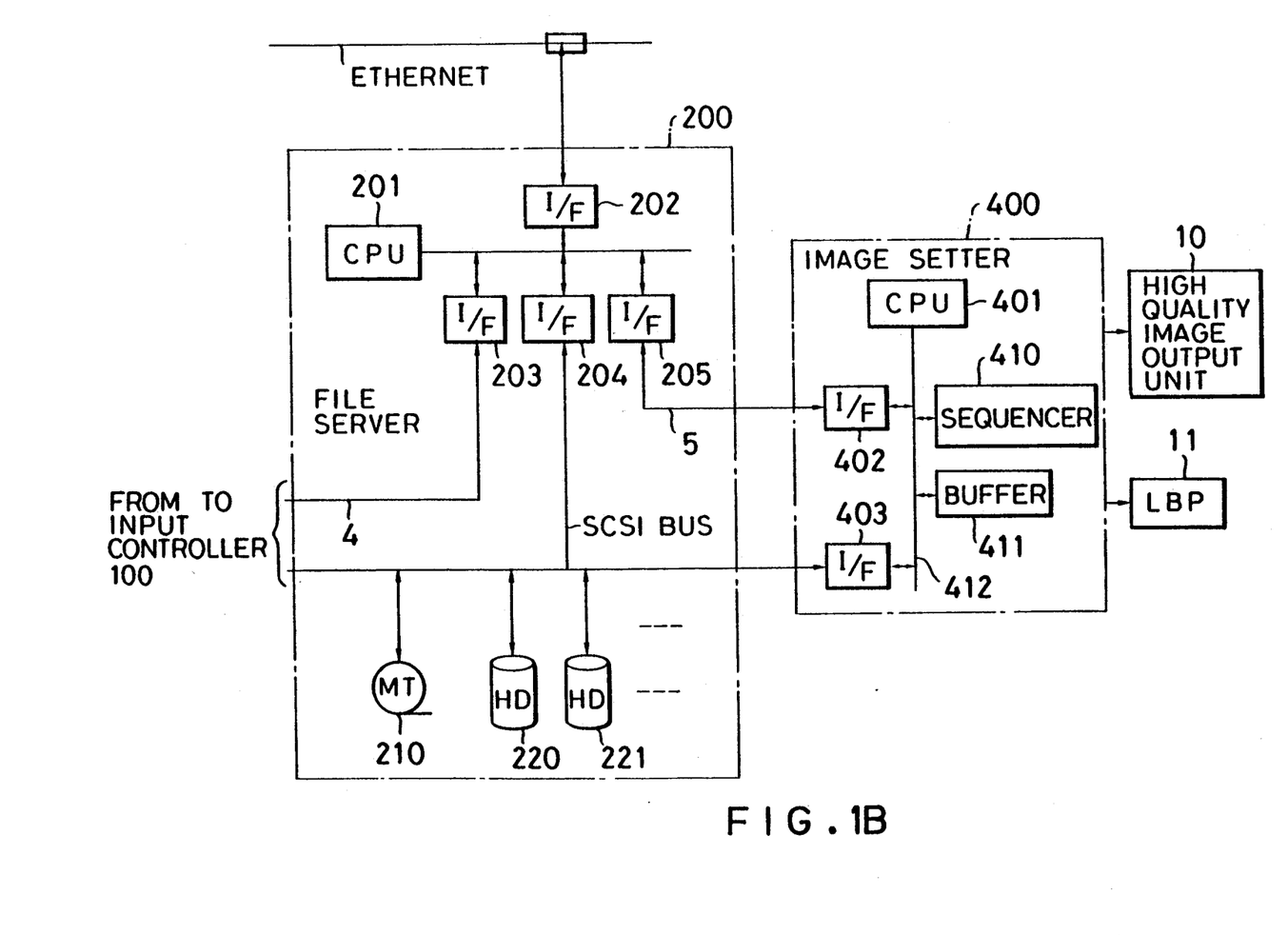

FIGS. 1A and 1B are block diagrams showing an image processing system according to this invention. An input unit 1 (such as a scanner or the like) is adapted to read originals such as designs, characters, patterns, a layout pasteboard and the like. Density data DD of the image as obtained by the input unit 1 is inputted to an input controller 100. The input controller 100 dots the aforementioned inputted density data DD through an incorporated CPU 101 by means of a halftoning circuit 102 and then compresses it by a compression circuit 103. The data is temporarily stored in a buffer 104 and transferred for storing them in a magnetic tape 210 of a file server 200 or hard discs 220, 221, . . . thereof. The input controller 100 includes a local disc (hard disc) 105 for temporarily storing the data. The file server 200 is provided with a CPU 201 and connected to the other apparatus through interfaces 202 to 205. A code information CD (such as characters and the like) which is obtained by an edition input unit 2 such as a word processor and composing machine and the like is once stored in a floppy disc 3 and then read out. The code information CD is then inputted to a work station 300. This input may be inputted on-line. The work station 300 carries a plurality of terminal units, each having a CRT 301 as a display means, a keyboard 302, a mouse 306 and a digitizer 303 as input operation means, and a hard disc 304 and a floppy disc 305 as memory means. The work station 300 is interconnected by an Ethernet (one type of bus line system) to the file server 200. Image data, frame data and contour display image data obtained by the input controller 100, which are thinned for the CRT display are stored as well as high density data (not thinned) for the image output, in the magnetic tape 210 or the hard disc 220, 221, . . . . The thinned data are read out and transferred by interfaces 204, 202 through an SCSI bus to the work station 300. A control command and the like between the work station 300 and the input controller 100 are transferred by the interface 203 of the file server 200 through an auxiliary line 4. The file server 200 is also connected to an image setter 400. More specifically, the image setter 400 is formed with a CPU 401 which is connected by an interface 402 to another auxiliary data line 5 of the file server 200 and is coupled by an interface 403 to the SCSI bus. The image setter 400 further includes a sequence 410 and a buffer 411 for storing required data. A high quality image output unit 10 for outputting the high quality image and a laser beam printer 11 for outputting the relatively low quality image are connected to the image setter 400. It is noted that the hard disc 220, 221, . . . are adapted to store not only fixed data (bit map data) such as a logo, a crest and the like but also vector font data for outputting characters.

Now, the input unit 1 is adapted to digitize all designs (gray scale image or halftone image), line image and character image (binary image) as density data (8 bit/-picture element). Signals that are input with 8 bits/picture element, such as for design images are dotted by the input controller 100 to produce information with 4 bits/picture element and binary images are converted to information with 1 bit/picture element. Generally the character is input from the work station 300 by means of the code, and also may be inputted as an image through the input unit 1. Because in this case the character is input as an image, it is handled as an image, more specifically as bit map data, through it looks or expresses a character. In the image setter 400 which performs all of the output operation, because the code and the vector information are wholly converted to the bit map data, the term of "image output" means outputting the bit map data.

In this manner, the image processing system of this invention requires neither manual paste-up of drawings and photographs nor manual photo-composing to facilitate reduction of labour and material.

Figure 2:
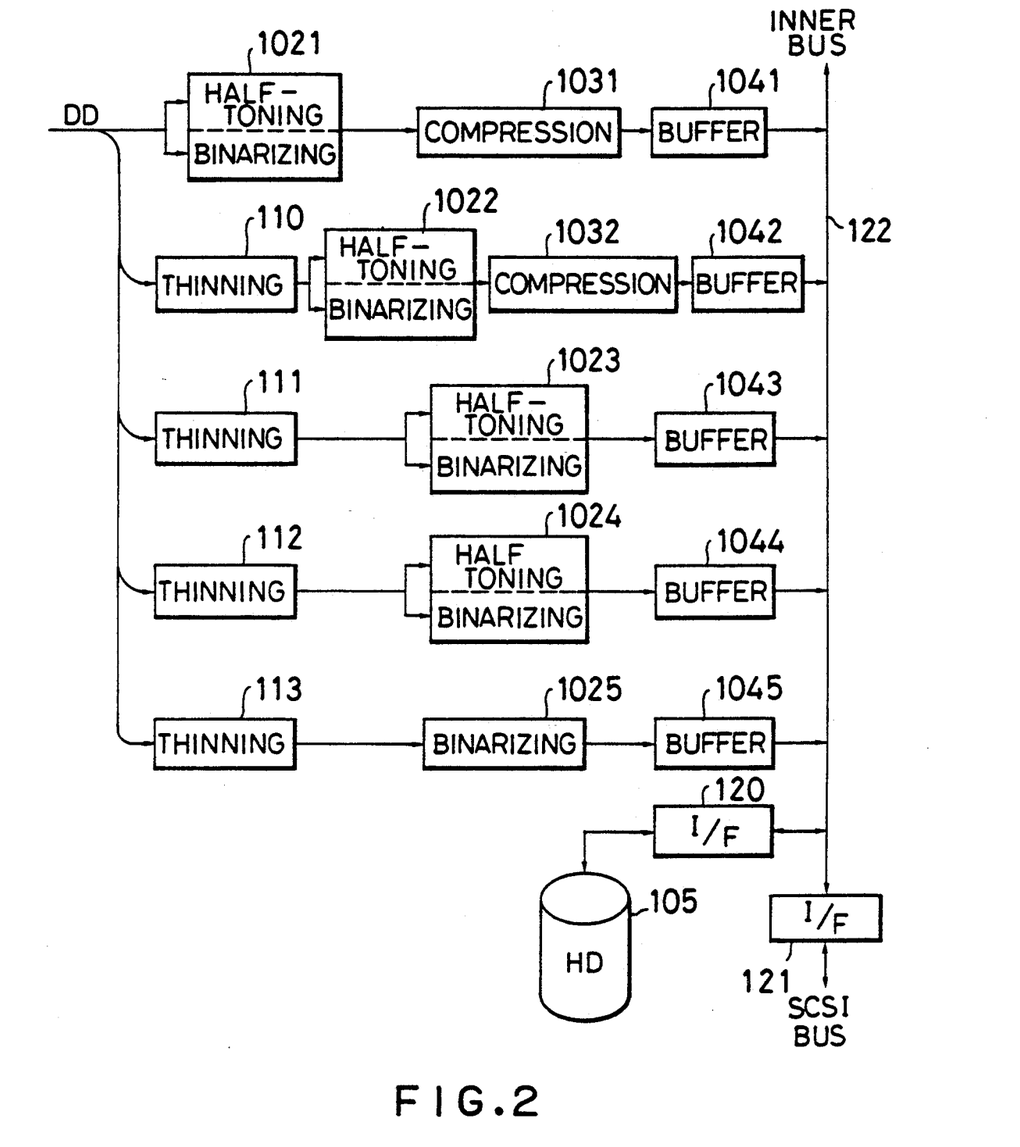
FIG. 2 is a block diagram showing one example of the configurations of the input controller.

Now, the input controller 100 will be illustrated with reference to FIG. 2. The input controller 100 is adapted to process the density data DD inputted from the input unit 1 to simultaneously create five sets of data which consist of high density data for the high quality image output unit 10, data for the laser beam printer 11, two types of data for the display of the CRT 310 of the work station 300, and the image data made rough enough to show a contour of the image. Simultaneous processing these data sets enables the system to accelerate the speed so that the data forming operation load of the CPU 101 may be reduced by the hardware. More specifically, the high density data for the high quality image output unit 10 is caused by dotting the density data DD through a halftoning circuit 1021 and data-compressing it through a compression circuit 1031, the compressed data being held temporarily in a buffer 1041. In order to obtain the data used for allowing the laser beam printer 11 of relatively low quality image to output the image, the density data DD is thinned (110) at a predetermined interval (for instance ½) and then the rough data is dotted by another halftoning circuit 1022 and compressed by another compression circuit 1032. The produced data is then temporarily held in another buffer 1042. Further, for the purpose of two types of rougher data for the CRT 301 display, the density data DD is thinned at a predetermined interval and dotted by different halftoning circuits 1023, 1024 and then temporarily held in different buffers 1043, 1044. For producing the data for the line image which is prepared when a cut-out mask is formed from a halftone image, the data after the Laplacean or the unsharp mask processing for representing the contour data is thinned (113) and then binarized by a binary circuit 1025 and also temporarily stored in a buffer 1045.

With this arrangement, the CPU 101 communicates with the input unit 1 by a data line (not shown) and also communicates through an auxiliary data line 4 and a dual port RAM (not shown) with the file server 200. When a data transmission request from the input unit 1 is made, the CPU 101 is caused to set the data required for the respective circuits shown in FIG. 2, storing the set data in the local disc 105 while a set value in association with the auxiliary scanning being set. The density data DD from the input unit 1 is inputted every one line and stored in the buffers 104 (1041 to 1045) upon synchronization of the respective circuits shown in FIG. 2. During the period of this time, the CPU 101 checks not only changeover of the SCSI bus and of a data compressing output buffer 1041 but also a presence of error information from the respective circuits. The data once stored in the buffer 104 and the local disc 105 are sorted by the command of the CPU 101 and outputted to the SCSI bus from without.

The file server 200 is fabricated in the manner as shown in FIGS. 1A and 1B and functions as common file control such as file control and community of files and as control of network communication and communication between units. More specifically, the file server 200 controls through the SCSI bus, the file for the hard discs (220, 221, . . . ) and the magnetic tape 210 and is adapted through the Ethernet to provide function as a software interface for the work station 300. In addition, the file server 200 fulfills utility functions with respect to service for file control information on the input controller 100 and the image setter 400 and with respect to file control via the SCSI bus. Such utility functions are, for instance, a registration of a font and a garbage collection (dust pick-up and disposal) and the like. The registration of the font may be classified into two types. The first type of the font registration is supported by the system, wherein a vector font prepared by another font preparing system is stored as a magnetic tape form in the hard disc of the present image processing system. The other type of the font registration is a registration of external characters which do not exist in the system. In this instance, the font prepared by another system is registered into the system by means of the floppy or magnetic tape.

The file server 200 is adapted to perform service and store the data for transferring the data between the work station 300 and the input controller 100 and between the latter and the image setter 400. The input controller 100 serves to obtain required information about reserving and deleting the region of respective file from the file server 200 through the auxiliary data line 4 and the dual port RAM. For the purpose of registering the data which is once held in the buffer 104 installed in the input controller 100, as the file for the image processing system, information on the file name, the file capacity and the like are transferred to the file server 200 to allow the hard discs 220, 221, . . . on the SCSI bus access thereto. This will enable the file server 200 to communicate with a directory and to control disc area and the like. The file server 200 is also adapted to transfer the file data by the Ethernet to the work station 300 and receive the data from the work station. At this moment, the file server 200 controls the hard discs (220, 221, . . . ) on the SCSI bus and the magnetic tape 210 under the command of the work station 300 to renew necessary information on the directory and the like. Further, the file server 200 obtains the command over the image setter 400 and the other command over the magnetic tape, thereby performing service according to those commands. The file server 200 sends a predetermined command through the auxiliary data line 5 and the dual port RAM to the image setter 400, while transferring the file control information in response to the request from the image setter 400, and is adapted to allow the image setter 400 to access directly to the disc data on the SCSI bus. In addition, the file server is adapted to control the utility information as to the whole image processing system by means of the hard discs 220, 221, . . . on the SCSI bus. Here the utility information includes the font information, common files and the like in the system.

Figure 3:
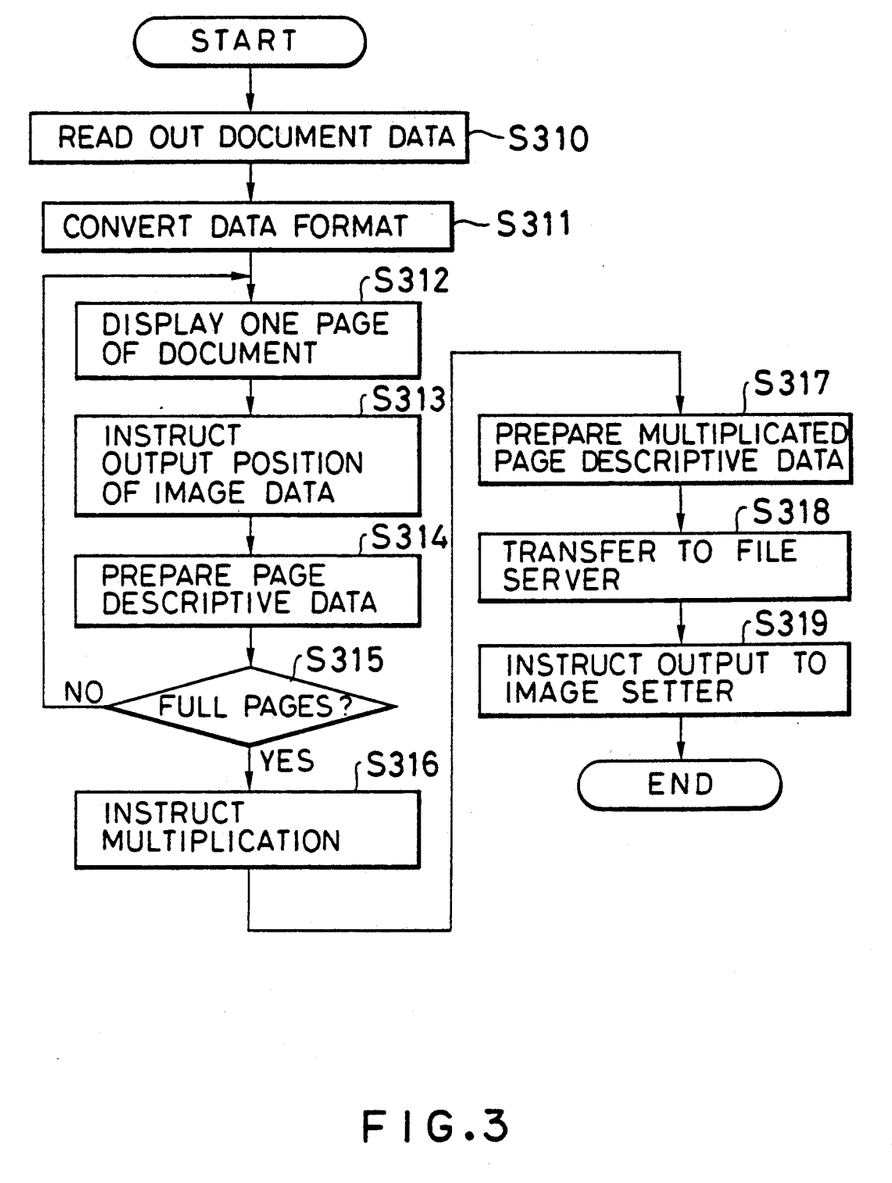
FIG. 3 is a flow chart showing an operation example of the work station.

FIG. 3 is a flow chart showing how the work station 300 functions. Document data edited and stored by the edition input unit 2 is read out of the floppy disc 3 (Step S310). Code information CD of the document data is subjected to conversion of the data format (Step S311). Content of the document in one page is then displayed in the CRT 301 (Step S312), while an image data output position of the image which may be read out of a layout pasteboard and the like, is instructed by the mouse 306, the keyboard 302 and the digitizer 303 (Step S313) to prepare the page description data for each page with a frame of the layout pasteboard (Step S314). In this manner, such data is prepared in full pages (Step S315), and then photo-composing for preparing a printing block copy is instructed by the keyboard 302 (Step S316), to obtain photo-composed page description data (Step S317). At the same time, the prepared data is transferred to the file server 200 (Step S318) simultaneously with instructing the image output to the image setter 400 for completing the operation (Step S319).

Figure 4:
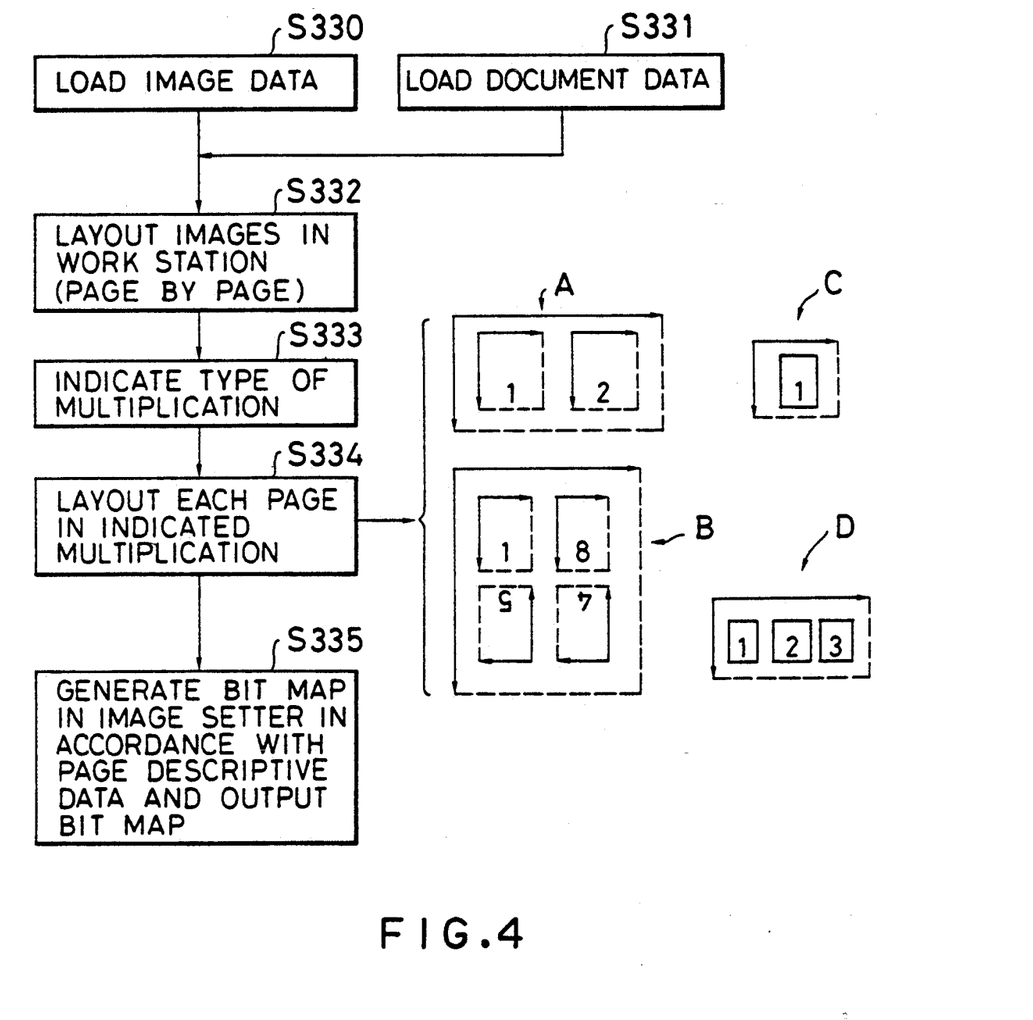
FIG. 4 is a flow chart explaining the operation of photo-composing.

Referring to FIG. 4, the example of the photo-composing process will now be described. The thinned image data in the hard discs 220, 221, . . . of the file server 200 are loaded in the work station 300 (Step S330) while the document data in the floppy disc 3 is loaded in the work station 300 (Step S331). Then, the necessary information is displayed on the CRT 301 of the work station 300, thus making it possible to suitably layout the image, the document and the frame by page by operating the mouse 306, the keyboard 302 and the digitizer 303 (Step S332). When indicating any of the types of photo-composing registered in advance with the keyboard 302 (Step S333), each page is displayed on the CRT 301 as being laid out in the indicated photo-composed state (for instance, "A" to "D" as shown in FIG. 4), with a suitable page number being given thereon (Step S334). The photo-composing state of each page is registered and stored with a proper page number being given thereon in advance with consideration given to the process of folding a plurality of pages in book binding and, for instance, takes the form of four pages of paper of trimmed size of A4, or eight pages of paper of a trimmed size of A5. When selecting and indicating any of the types of photo-composing states, the photo-composing state so selected is displayed with the proper page numbers being given to the associated pages (for instance, "1", "8", "5", "4", in FIG. B), as "A" to "D" shown in FIG. 4. The display on the CRT 301 on this occasion is designed to show only the photo-composing states of the pages, and the contents of the pages such as the images and characters thereon are not displayed, bit maps being generated by the image setter 400 in accordance with the page description data and then outputted (Step S335).

Figure 5:
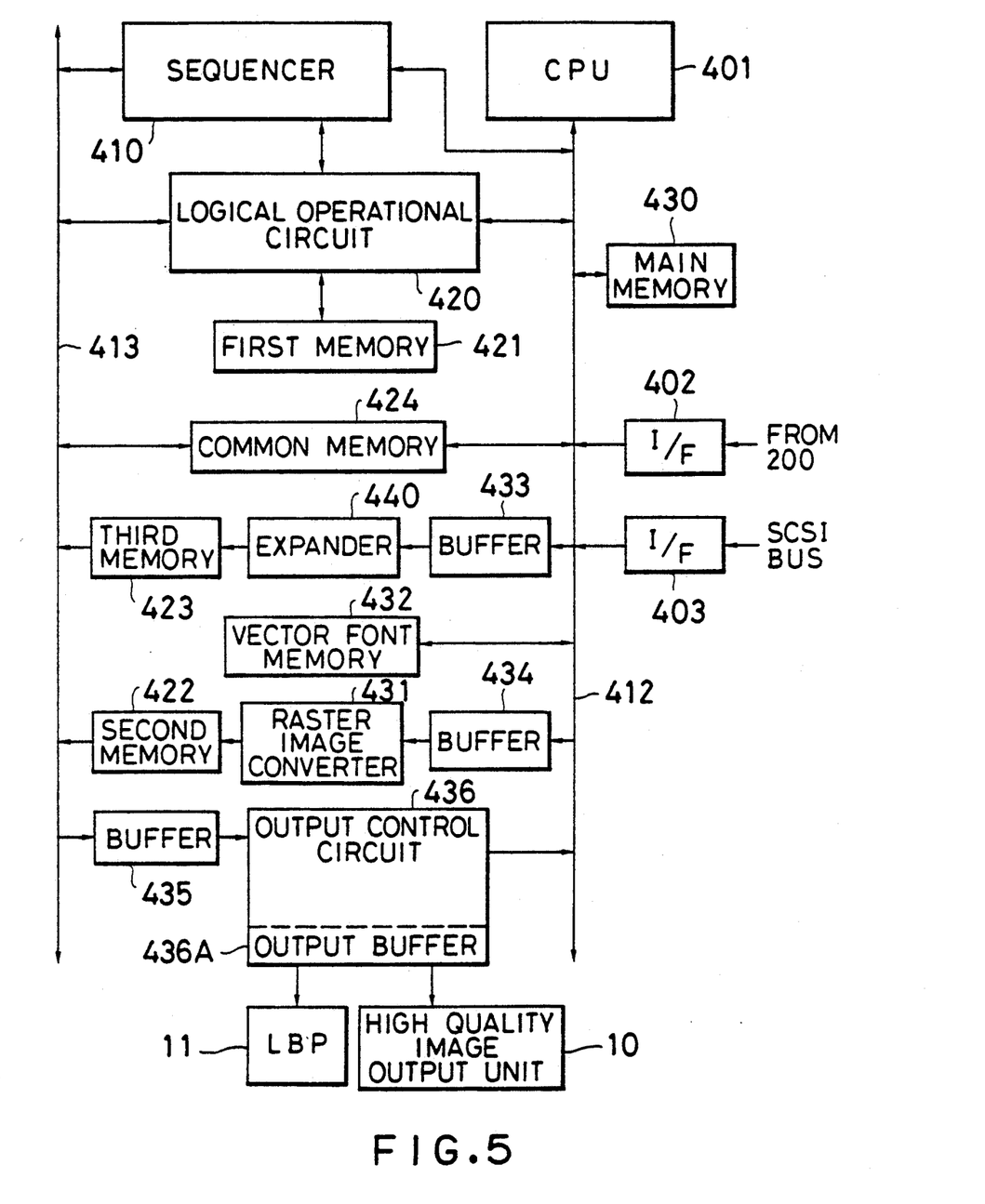
FIG. 5 is a block diagram showing in detail the configuration of the image setter.

FIG. 5 shows in detail an example of the configuration of the image setter 400. A CPU bus 412 and an image data bus 413 are connected to the sequencer 410, and a logical operation circuit 420 and a first memory 421 are also connected to the same sequencer 410. In addition, a main memory 430 for the CPU 401 is connected to the CPU bus 41, and a common memory 424 is disposed between the two buses 412 and 413 so as to connect the former to the latter, the output from the interfaces 402 and 403 being inputted into the CPU bus 412. A buffer 433, an expander 440 and a third memory 423 are connected to each other in that order between the CPU bus 412 and the image data bus 413, and a buffer 434, a raster image converter 431 and a second memory 422 are also connected to each other in that order between the same buses 412 and 413. In addition, a buffer 435 and an output control circuit 436 are also connected to each other between the buses 413 and 412. A vector font memory 432 is connected to the CPU bus 412, and the high quality image output unit 10 and the laser beam printer 11 are respectively connected to the output control circuit 436 via an output buffer 436A.

Vector font is stored in the vector font memory 432, which font is needed at the time when character bit maps are generated by the raster image converter 431. The vector font is normally stored in the discs (220, 221, ...), and it is not efficient to read out them via the SCSI bus every time a character bit map is generated. To deal with this, every needed vector font is designed to be loaded in the vector font memory 432 in advance, thus making it possible to improve the speed at which a character bit map is generated.

Figure 6:
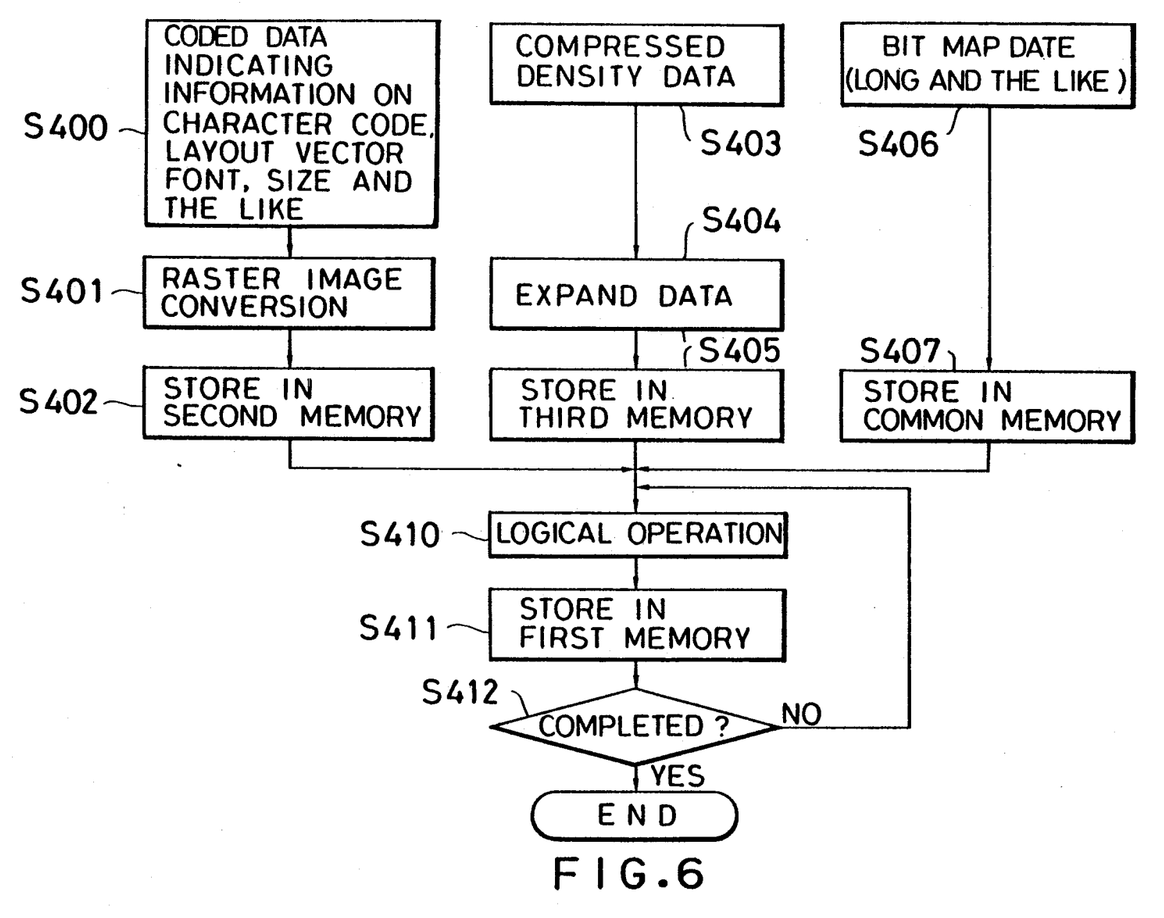
FIG. 6 is a flow chart showing an operation example of the same image setter.

The operation of the image setter 400 which is configured as described above is shown in FIG. 6. At first, a request for output indication is outputted from the file server 200 through the auxiliary data line 5 to the image setter 400 by using a file name stored in the hard discs 220, 221, ... as a parameter. The specification to be outputted is written in the file. While sequentially decoding this specification, address computation of the coded data and the compressed data is performed relative to every image unit, and the overlapping process by the logical operation is repeated relative to the address, the results of the processing are stored in the first memory 421. Calling the parameter file via the SCSI bus, the image setter 400 repeats this operation. With regard to the coded data, for instance, the character code and such indicating information as position, type face, size and the like are inputted via the SCSI interface 403 (Step S400), and the raster image conversion of what is inputted is effected by the raster image converter 431 via the buffer 434 (Step S401), the raster image data then being stored in the second memory 422 (Step S402). In addition, the data-compressed image data is sent by way of the SCSI bus and is inputted via the interface 403 (Step S403), and the data is sent by way of the buffer 433 and is expanded by an expander 440 to be reproduced (Step S404), the reproduced image data then being stored in the third memory 423 (Step S405). Moreover, the bit map data such as logotypes and the like which are stored in the hard discs 220, 221, ... are inputted via the interface 403 (Step S406) and are stored in the common memory 424 (Step S407). All data stored in the second memory 422 through the common memory 424 are bit map data, and the logical operation of this stored data is performed via the CPU 401 in the logical operation circuit 420 (Step S410), the data which are so logically operated as to synthesize, edit or image-process pictures, documents or the like are stored in the first memory 421 (Step S411). After the data have been stored in the first memory, judgement of whether the editing work is to be completed or not, in other words, whether or not there will be further additions or modifications to be made, is made (Step S412), and this operation of the judgement continues until the logical operation of modification or the like has been completed. This logical operation circuit 420 effects in cooperation with the CPU 401, the logical operation of the bit map data generated from the coded data, i.e. characters or the like, the bit map data obtained by expanding the compressed image data and the "sum", "product", "difference", "exclusive-or" and the like of the bit maps, so as to generate image information for being outputted via the output 10 or the laser beam printer 11.

Figure 7:
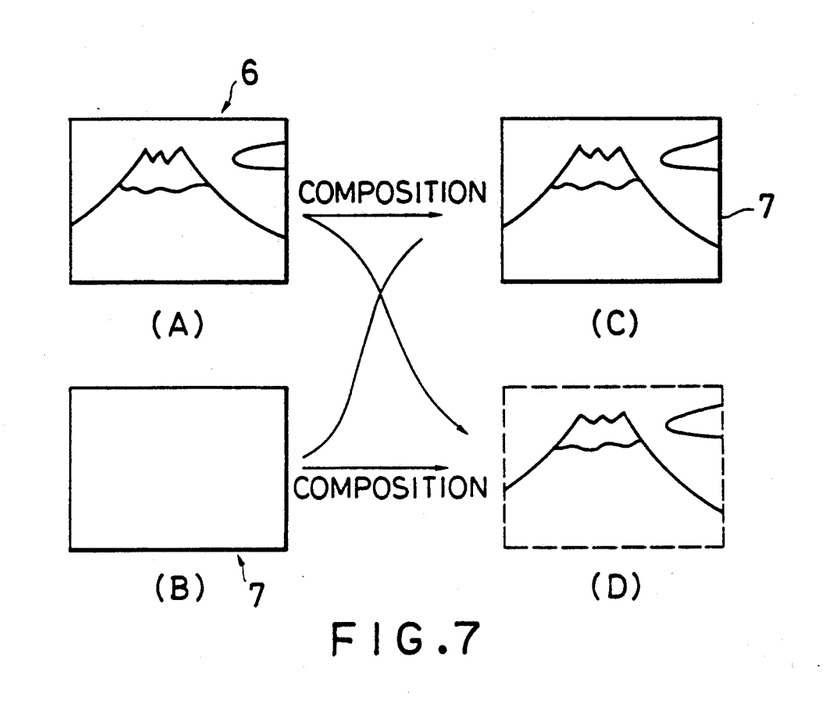
FIG. 7 and FIG. 8 are views for explaining the image composing method of this invention.
Figure 8:
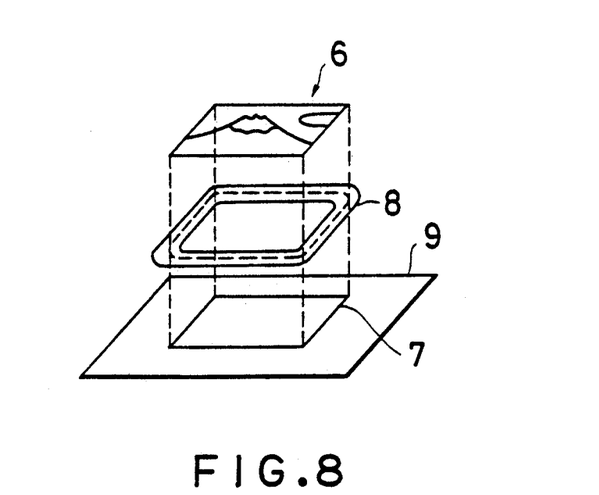

In the image processing system as described above, when a pattern frame formed on the basis of a frame drawn on a layout pasteboard happens to be an unruled edge, it is necessary to eliminate or erase the frame drawn on the layout pasteboard. For more specific explanation, it is assumed that an image 6 is laid out on the display means in the work station 300 as shown in FIG. 7(A) and a frame 7 is drawn on the layout pasteboard as shown in FIG. 7(B). In this case, when the image 6 is fit into the frame so as to compose an output image, the frame 7 is inevitably outputted as shown in FIG. 7(C). Therefore, if the pattern frame is to have an unruled edge, it is necessary to output the design alone without the frame 7 as shown in FIG. 7(D). To achieve this, an eliminating frame 8 is automatically generated by applying the constituent points on the pattern frame or the contour of the image 6 which is formed based on the frame 7 of the layout pasteboard. More specifically, an eliminating frame 8 which is automatically generated by connecting all the constituent points mentioned above to form a fold line, having enough width to cover the frame 7 and 0% of the line plain screen tone, is adapted to position above the image of the layout pasteboard and exactly below the pattern frame of formed image 6 as illustrated in FIG. 8.

Figure 9:
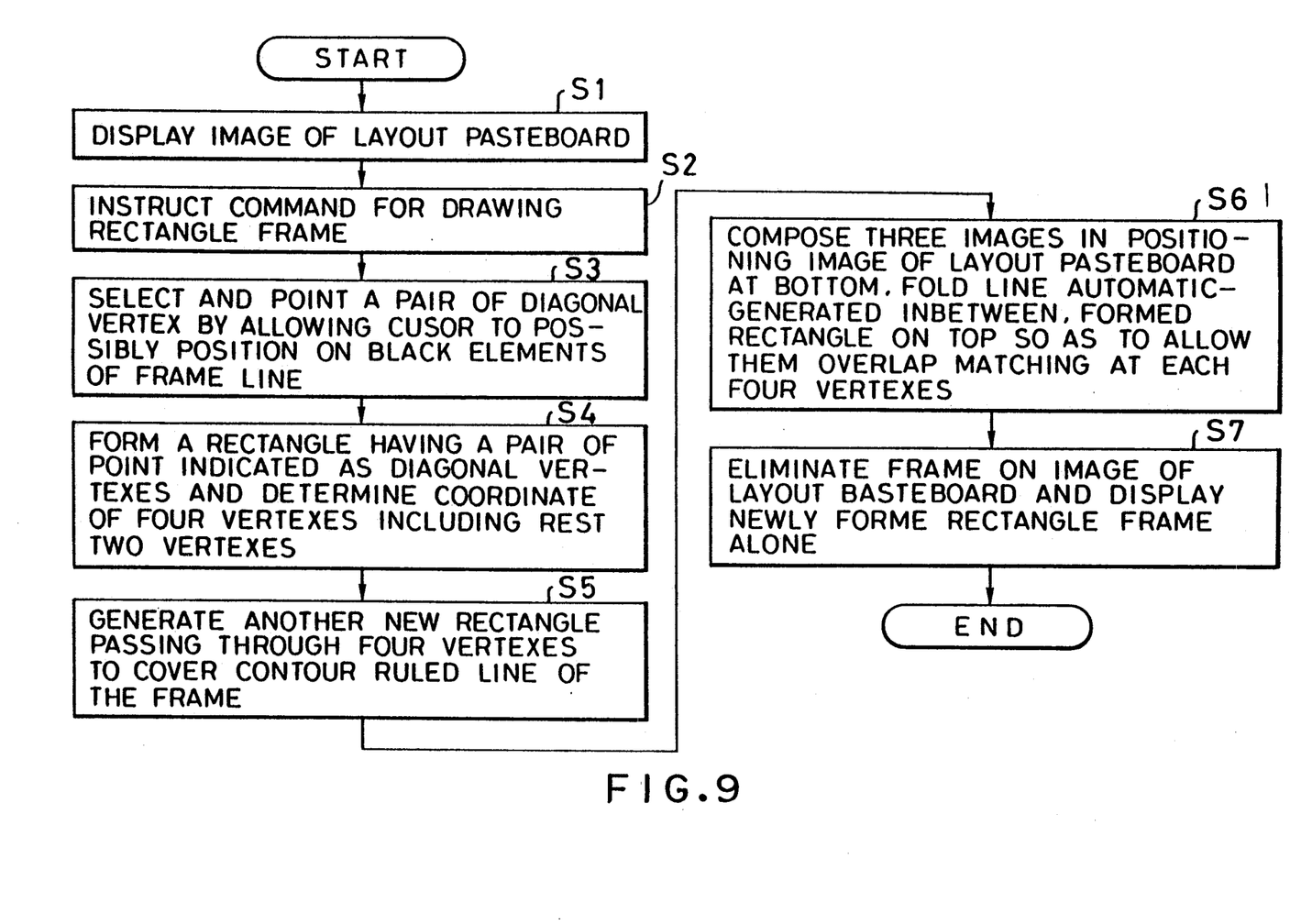
FIG. 9 is a flow chart showing an operation example of this invention.

In the following, a concrete example is shown with the help of a flow chart in FIG. 9. First, the image of the layout pasteboard on which the frame 7 is drawn is displayed on the CRT 301 (Step S1). Instructing a command for generating a rectangle frame by means of the mouse 306 (Step S2), the operator selects and points a pair of diagonal vertexes by allowing the cursor through the mouse 306 to possibly position on the black picture elements of the frame line (Step S3). A rectangle having a pair of the indicated points as respective diagonal vertex is caused to form (Step S4). Another rectangle (or fold line), having the same four vertexes including the rest two vertexes with those of the rectangle performed in the Step S4 is caused to exist as an eliminating frame 8, so that the frame 8 may cover and hide the contour ruled line of the frame 7 (Step S5). In this process, for example, if the line of the frame 8 is assumed to have a width of 1 mm, the line is adapted to spread out by 0.5 mm on both side from the center thereof and to have 0% of the plain screen tone, i.e. to be white and opaque. Then, the three images are composed to display or output in such a manner as shown in FIG. 8 that the image of the layout pasteboard having the frame 7 drawn may be laid at the bottom, the formed pattern frame is positioned on the top and the eliminating frame 8 automatically prepared is located in-between and these three images may be overlapped matching at each of the four corresponding vertices (Step S6). In the process above-described, the frame 7 on the layout pasteboard 9 is eliminated and newly formed pattern frame alone with the image is displayed as shown in FIG. 7(D) (Step S7).

It is noted that the pattern frame to be made can be realized not only with a rectangle but also with other shapes including a curve, as well as the eliminating frame generated from the former pattern frame. Moreover, the width of the eliminating frame may be also freely determined.

According to the image composing method of this invention, it is possible to edit and process a large quantity image data of characters and pictures at a high speed and to output high quality images for printing of the form indicated by layout and it is possible to easily make bit maps of vector information by the hardware and further to easily image-process, manufacture and edit. In the image processing system for outputting the image laid out of characters and pictures, if the pattern frame formed on the basis of the frame drawn on the layout pasteboard happens to be an unruled edge, it is possible to cover or eliminate the frame on the layout pasteboard by automatically generating the eliminating frame without any extra instruction.

It should be understood that many modifications and adaptations of the invention will become apparent to those skilled in the art and it is intended to encompass such obvious modifications and changes in the scope of the claims appended hereto.

What is claimed is:

1. An image composing method, in an image processing system having an input unit to read image data, memory means to store said image data and an image setter to read said image data stored in memory and to process said image data to output an image representative thereof on a display means, said method comprising the steps of:

inputting, via the input unit, an image of a layout pasteboard as said image data and a print image as image information and storing the image of the layout pasteboard and the print image in said memory means, displaying the image of said layout pasteboard and said print image on said display means, wherein said image of the layout pasteboard and print image are processed by a work station, drawing, in said display means, an image of a pattern frame on said image of the layout pasteboard, wherein said pattern frame represents a region in which the print image is to be positioned, said pattern frame being surrounded by a contour line, subsequently generating an eliminating frame based on said contour line surrounding the pattern frame and overlaying said eliminating frame on the pattern frame, in order to prevent said pattern frame from being output with a composite image that includes the image of the pasteboard and the print image.

2. An image composing method according to claim 1, wherein said pattern frame represents a rectangularly shaped unruled edge surrounding the print image.

3. An image composing method according to claim 2, wherein said pattern frame drawing step includes the steps of:

issuing a command to generate a rectangle frame, selecting a pair of diagonal pattern frame vertices, and forming a rectangle frame having said pair of selected diagonal vertices as corner points.

4. An image composing method according to claim 3, wherein said rectangle frame generating command is instructed by a mouse and said step for selecting a pair of diagonal vertexes is performed by using a mouse to position a cursor on a black picture element of the pattern frame representing the contour line.

5. An image composing method according to claim 3, wherein said fold line is white and opaque.

6. An image composing method according to claim 1, wherein said pattern frame drawing and eliminating frame generation steps include the steps of:

operating a mouse to issue a rectangular frame generation command, selecting, via said mouse, a pair of diagonal vertices, forming a first rectangular frame, representing said pattern frame, having said selected pair of diagonal vertices as opposite corners of said rectangular frame, forming a second rectangular frame, representing said elimination frame, having vertices with fold lines therebetween that correspond to corner points of said first rectangular frame, wherein said eliminating frame is positioned to overlap contour lines of the pattern frame.

7. An image composing method according to claim 1, wherein a minimum width of said eliminating frame is wider than the width of said contour line of the pattern frame, said eliminating frame having a white and opaque tone to blend with a tone of said work station display screen.

8. An image composing method according to claim 7, wherein said print image is overlaid onto said eliminating frame and said eliminating frame is overlaid onto said pattern frame of the layout pasteboard to form an output image having a print image therein without a contour line around the print image.

9. An image composing method, according to claim 1, further comprising the step of:

composing said composite image by overlaying said print image on said eliminating frame after said eliminating frame is overlaid on the pattern frame.

* * * * *